No. 778,376. Patented December 27, 1904.

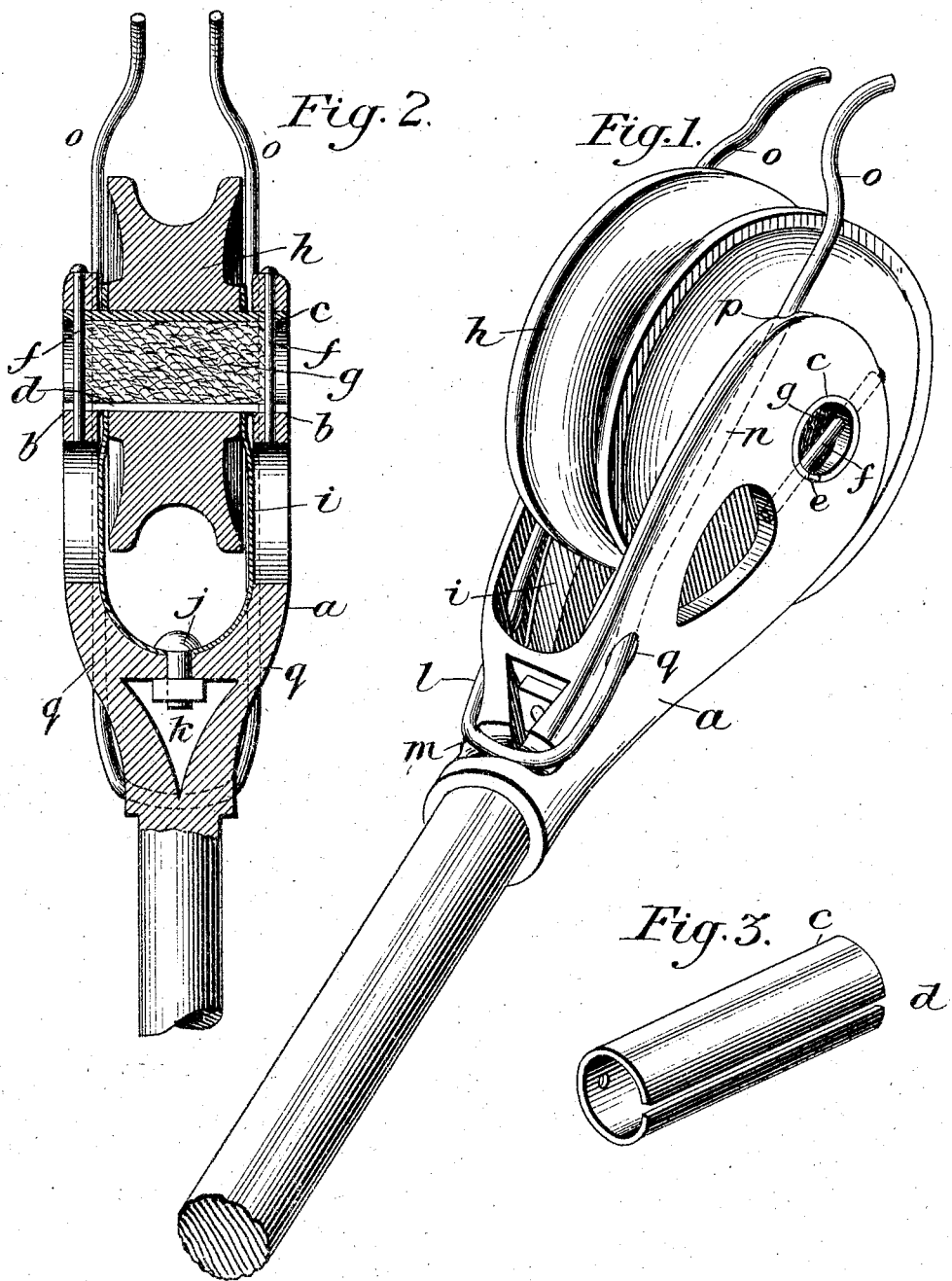

UNITED STATES PATENT OFFICE.

STEPHEN GIRARD REYNOLDS, OF EASTON, PENNSYLVANIA, ASSIGNOR OF ONE-HALF TO NATHAN FREEMAN, OF EASTON, PENNSYLVANIA.

TROLLEY HARP AND GUARD.

SPECIFICATION forming part of Letters Patent No. 778,376, dated December 27, 1904.

Application filed June 29, 1903. Serial No. 163,592.

*To all whom it may concern:*

Be it known that I, STEPHEN GIRARD REYNOLDS, a citizen of the United States, residing at Easton, county of Northampton, State of Pennsylvania, have invented certain new and useful Improvements in Trolley Harps and Guards; and I do hereby declare the following to be a full, clear, and exact description of the invention, such as will enable others skilled in the art to which it appertains to make and use the same.

My invention has for its object to provide an improved trolley-head and guard therefor; and it consists in the various details of construction illustrated in the accompanying drawings, in which—

Figure 1 is a longitudinal cross-section of a trolley-head having my improvements applied thereto. Fig. 2 is a perspective view thereof, and Fig. 3 is a detail perspective view of my preferred form of shaft or pintle upon which the trolley-wheel is mounted.

Referring to the drawings, $a$ indicates the usual form of trolley-harp, having a forked or bifurcated upper portion, in which the trolley-wheel is mounted, and a base portion terminating in a shank adapted to swivel in the ordinary form of trolley-pole. The opposite faces of the harp $a$ are provided with bearings $b$ for the journal or axle $c$, upon which the trolley-wheel $h$ freely revolves.

It is essential that the trolley-wheel revolve on its journal with as little friction as possible, and hence it is necessary that the bearing-surfaces between the wheel and its journal be thoroughly lubricated and that the journal be mounted firmly and securely in its bearings in the harp. To these ends the journal $c$ is made hollow and is provided with a longitudinal slot $d$, so that said journal contracts and expands radially with the contraction and expansion of the bearings $b$, thereby insuring a snug fit between the journal and the bearings at all times. The interior of the hollow journal is provided with a lubricating-packing $g$, preferably of oil-soaked asbestos, which supplies a proper amount of lubricant to the trolley-wheel by way of slot $d$. Two transverse pins $f$ are passed through registering holes in the outer ends of the harp $a$ and the ends of the journal $c$, which pins serve the double purpose of locking the journal in its bearings and securing the lubricating-packing in the hollow journal.

A U-shaped contact-spring $i$ lies within the hollow of the harp and is secured to the latter by means of a bolt $j$, passing through the bends of the spring and the harp and locked in position by a nut let into a recess $k$ in the shank of the harp. The upper ends of said spring are perforated to embrace the journal $c$, and each end bears with a firm pressure upon the contiguous face of the trolley-wheel $h$ to afford a good electrical contact between the trolley-wheel and the leads on the trolley-pole.

In order to prevent the trolley-wheel from accidentally leaving the trolley-wire, I provide a simple form of guard, which consists of a generally U-shaped metal yoke having its lower curved portion $m$ lying in a transverse recess in the shank of the trolley-harp, its legs or uprights $n$ passing through openings $q\,q$ in the opposite faces of the fork and lying in grooves or channels in said fork-faces and its end $o\,o$ bent inwardly and rearwardly, so as to overlie the groove in the trolley-wheel and present but slight resistance to an obstructing or low-hanging trolley-wire support. It is to be noted that the relation of the free ends of the guard-yoke to the wheel-slot will retain the trolley-wire properly within the wheel-slot and any tendency of the trolley-wheel to jump either laterally or downwardly from the wire will be instantly met and defeated by the incurving ends of the guard.

What I claim as my invention is—

1. A trolley-guard, comprising a generally U-shaped yoke fixed in the opposite inner faces of the trolley-harp, and having its free ends bent inwardly and rearwardly to overlie the groove in the trolley-wheel.

2. A trolley-guard, comprising a generally U-shaped yoke having the bend thereof engaging the base of the harp and its legs lying in the opposite faces of said harp, the outer ends of said yoke being bent inwardly and rearwardly to overlie the groove in the trolley-wheel.

3. In a trolley, a harp having grooves in its inner sides and a recess in its base, and a trolley-guard, comprising a generally U-shaped yoke having the bend engaging the external recess at the base of the harp, and having its legs passed through openings $q$, $q$, in the harp, and lying in the grooves on the inner sides of the arms of the harp.

In testimony whereof I affix my signature in presence of two witnesses.

STEPHEN GIRARD REYNOLDS.

Witnesses:
    CHAS. B. BRUNNER,
    JOHN BRUNNER.